Oct. 1, 1968  L. D. MICHAEL  3,404,252
HEAT CONTROL METHOD AND APPARATUS FOR SPOT-WELDS
Filed Jan. 3, 1966
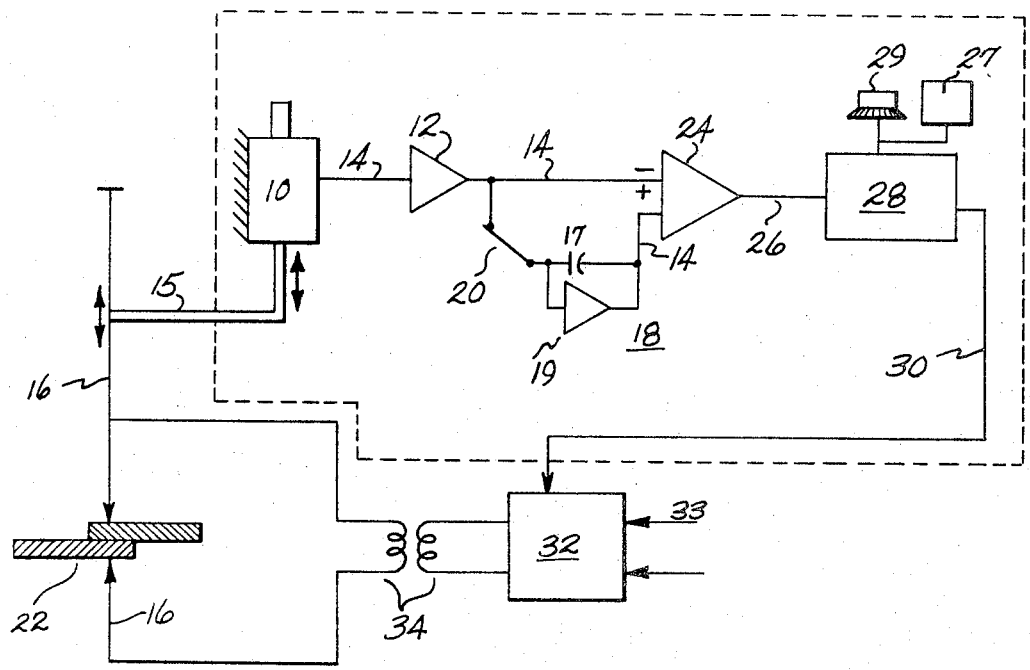
INVENTOR.
LEROY D. MICHAEL
BY
ATTORNEY

United States Patent Office 3,404,252
Patented Oct. 1, 1968

3,404,252
HEAT CONTROL METHOD AND APPARATUS FOR SPOT-WELDS
Leroy D. Michael, Selleck, Wash., assignor to The Boeing Company, Seattle, Wash., a corporation of Delaware
Filed Jan. 3, 1966, Ser. No. 518,183
2 Claims. (Cl. 219—110)

ABSTRACT OF THE DISCLOSURE

A resistance welding method and apparatus wherein the physical expansion of the weld bead is measured to generate an electrical signal which is compared with a pre-established reference electrical expansion signal to derive a control feedback electrical signal which alters the heat application to the weld bead to conform with the pre-established conditions.

---

This invention relates to apparatus for improving the quality of resistance welded joints and in particular to means for controlling the heat produced by the weld electrode by using physical weld growth as a monitor for the voltage supplied to the electrode.

Control of the heat generated during a welding operation is necessary to improve weld joint reliability and to reduce costly rejection of a welded part. A feature of the instant invention is the use of expansion of the weld bead and the physical measurement thereof, in combination with circuit means, to provide feedback to control means which energize a voltage source providing voltage to the weld electrode so as to monitor and control weld heat instead of controlling the time variable as in many of the prior art apparatus.

In the production of a resistant spot-weld, the column of metal clamped between the welding electrodes is heated by flow of current through the electrodes. The metal column is caused to expand until a critical temperature is reached, viz., where the unit electrode force equals the yield point of the metal at that temperature. As heating progresses, the mass of molten metal, which later forms the weld bead or nugget, continues to increase in fluidity. This change in metallic state is accompanied by a considerable increase in volume of the weld. For proper fusion of metal, heat control is critical; by accurately monitoring the physical increase in volume and surface area of the weld nugget, heat supplied to the joint to be welded is accurately controlled according to the teachings of this invention. Since weld expansion is an indication of weld quality and size, the instant invention makes novel use of an expansion measuring system which, in combination with any of the known welding apparatus, provides a voltage output proportional to the actual expansion of the weld area.

Several proposals have been made in the prior art to use weld expansion as a means of controlling the time variable in a welding operation. For example, the patents to Sciaky, No. 2,851,583, and 2,851,584. Neither of these references make use of expansion measurements of the weld to control weld heat. Another reference, the patent to Van Sciver II, provides weld control in a spot-welding machine by monitoring an electrical signal due to change in resistance of a weld nugget as the weld nugget grows in size and comparing the electrical signal with a pre-set control time function curve of voltage to the electrode. Thus, the Van Sciver patent monitors voltage supply to an electrode in accordance with a time-dependent function by monitoring a voltage signal from variations in resistance caused by weld growth and comparing such signals with pre-set time-voltage functions to enable the welder to control the time of voltage application to the weld area. Such a method of monitoring a welding operation has inaccuracies inherent therein: the resistance is not simply a function of weld growth but also a function of surface conditions and the condition of the weld itself, i.e., molecular structure. The instant invention, as noted cursorily above, distinguishes from the prior art in that the instant invention does not control the time variable during which voltage is applied to the weld electrode by a measurement of physical weld growth or by monitoring resistance change in a circuit which includes the weld but rather provides heat control at the weld electrode by means of a transducer which is actuated by the physical growth of the weld exerting pressure against the electrode. The transducer transposes physical movement of the weld into a control function which provides a curve; control means interpret the area under the curve in terms of the area of the weld nugget. The area of the weld nugget provides a pre-set electrical impulse to a control voltage source, thereby controlling heat through the electrode.

Accordingly, an object of the invention is to provide apparatus to continually monitor the physical size of weld nugget growth.

Another object of the instant invention is to provide apparatus in combination with means continually monitoring weld nugget growth in a welding process to control the quantity of heat involved in the welding process, including control means responsive to measurement of weld nugget growth.

A further object of the instant invention is to provide means in combination with welding apparatus to provide heat measurement and heat control of the weld in a spot-weld process, so as to improve weld joint reliability and to reduce costly rejection of welded parts.

With these and other objects in view, the invention consists of certain novel features of construction and operation as will be more fully described and particularly pointed out in the specification, drawings and claims appended hereto.

In the drawing, which illustrates an embodiment of the invention and wherein like reference characters are used to designate like components:

The sole figure represents a schematic diagram of the electromechanical system which is connected to the upper welding electrode of any of the welding apparatus known in the art to provide an expansion voltage pulse according to the teachings of this invention.

Referring to the figure, a differential transformer 10 and amplifier 12, interconnected by circuit means 14 and connected by suitable means 15 to an upper movable weld electrode 16, converts the physical movement of the upper electrode 16 into a directly proportional voltage; i.e., proportional to mechanical translation axially) of electrode 16. A clamping or voltage holding circuit 18 including a voltage holding capacitor 17 disposed in parallel relationship to a voltage holding amplifier 19 is connected in series by circuit means 14 to said amplifier 12. The holding circuit 18 electronically establishes a point of reference (i.e., a voltage pulse) once the electrode 16 is positioned upon the workpiece 22. Relay contact 20 is closed during positioning of electrode 16 upon workpiece 22; voltage flow into capacitor 17 continues during positioning so that when the welding operation begins relay 20 is opened and the charge on capacitor 17 provides the reference starting position of electrode 16. The charge on capacitor 17 is maintained due to the high impedance of amplifier 19. Thus a reference voltage is provided during the weld operation to a summing amplifier 24. A summing amplifier 24 is connected in series to the amplifier 12 and to the clamping or voltage holding circuit 18 by circuit means 14. The voltage from the differential transformer 10 is summed in amplifier 24 to produce an expansion voltage pulse in the circuit line 26, which is proportional to the voltage pulse produced by transformer 10 due to the physical movement of the electrode 16, above the established reference level, electronically established by the holding circuit 18.

The expansion voltage pulse is applied by line 26 to a heat control voltage comparison circuit 28, having a control set knob 29 capable of adjusting, by means not shown, for comparison readings. The heat control comparison circuit 28 compares the expansion voltage pulse from the summing amplifier 24 against a pre-selected reference expansion voltage pulse curve or voltage level which is maintained in a reference generator means 27 and produces a signal in the line 30 which is fed to the weld phase shift machine heat control 32. The weld phase shift machine heat control 32 derives power from supply lines 33. Thus, the signal in line 30 provides the automatic electronic stimulus which adjusts the weld phase shift machine heat control 32 toward increased or decreased heat input to the workpiece 22. Heat generating power from the heat control 32 is transmitted across transformer coils 34 to the respective electrodes 16.

In operation, the apparatus of the figure increases weld reliability in any one of the three methods discussed below.

Method 1 can best be understood by reference to the figure and to the set of three curves which follow; viz., expansion curve (1), heat input curve (2), and control voltage curve (3):

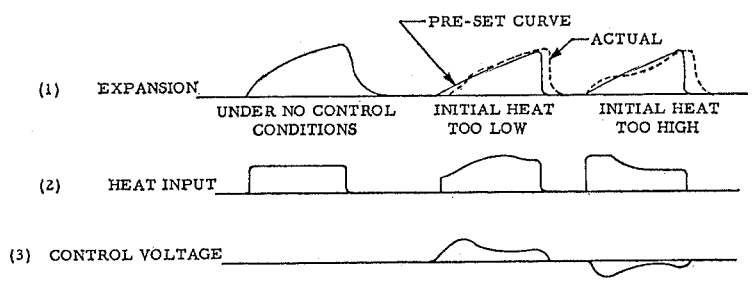

According to method 1, a difference is detected between an actual expansion voltage pulse from the weld and a preset expansion reference voltage pulse. This difference is detected by the heat control comparison circuit 28 which receives the actual expansion voltage pulse on line 26 and compares it with the pre-set expansion voltage curve from generator 27. The curves (1) or expansion set of curves are developed by and graphically reproduced in the heat control comparison circuits 28, which includes graphic means such as an analog computer or oscilloscope, by feeding to the comparison circuits 28 information in terms of the actual expansion voltage pulse from the summing amplifier 24 and the pre-set expansion voltage pulse from generator means 27 by manipulation of control knob 29. By comparing the curve developed from the pre-set expansion voltage pulse from means 27 with the actual curve developed from the actual expansion voltage pulse during welding operation, heat input to the weld electrodes 16 is controlled by a control voltage pulse or signal output in line 30, proportional to the detected difference, from the heat control comparison circuits 28. The latter signal appropriately stimulates and controls the weld phase shift machine heat control 32 to increase or decrease the heat input at the weld workpiece 22 in accordance with the curves (2) by feeding the control voltage in accordance with the curves (3) to the heat control or phase shift unit 32. Thus the expansion curves are made to fit the pre-established or pre-set curve seen in the curves (1).

Method 2 can best be understood by reference to the figure and to the set of three curves which follow; viz., expansion curve (4), heat input curve (5), and control voltage curve (6):

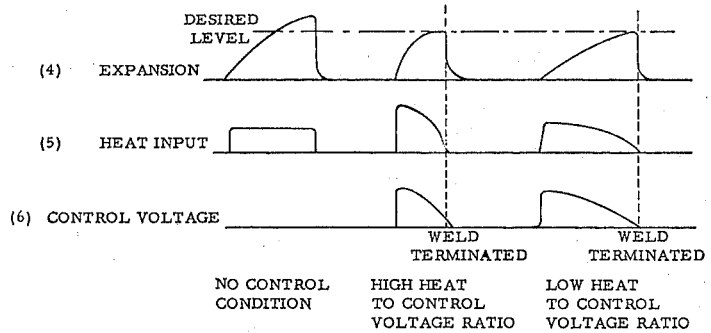

In operation, method 2 achieves heat control in a welding process by controlling heat to arrive at a pre-selected level of heat without regard to the slope of the expansion curve or to time of weld nugget expansion as in method 1. In the instant method, a difference is detected by comparison circuits 28 between an actual expansion voltage pulse produced on line 26, graphically represented as the expansion voltage curve (4) within the comparison circuits 28, and a pre-set voltage representing a desired level of amplitude of the actual expansion voltage pulse, maintained in generator 27, as indicated in curve (4). The detected voltage difference, represented by a voltage signal output from circuits 28, is applied as a control voltage (see curve 6) by line 30 to the heat control 32. By controlling the ratio of control voltage to heat input (i.e., voltage input) to the weld electrodes (curves 5 and 6) the welding operation is terminated when the desired level of heat as represented in curve (4) is attained.

A third method providing heat control for welding operations is described with reference to the figure and the following set of three curves; viz., expansion curve (7), heat input curve (8), and control voltage curve (9):

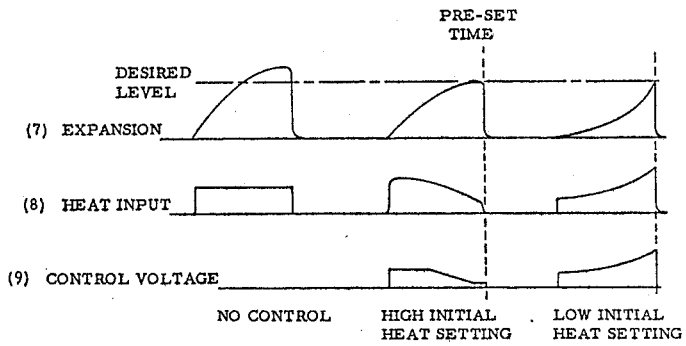

In operation, method 3 comprises the application of the apparatus described with reference to the figure to detect the difference by comparison circuits 28 between actual weld expansion voltage pulse produced on line 26, graphically represented as the expansion curve (7) within circuits 28, and a pre-set voltage pulse maintained in generator 27 representing the desired level of amplitude of the actual expansion voltage pulse as indicated in curve (7). Also detected by the heat control comparison circuits 28 is the difference between actual welding time and the total pre-set weld time required by the particular welding operation and referenced also in generator 27. This pre-set information is retained and summed by the circuits 28, i.e., any of the well known memory and computer summing circuit mechanisms. The detected time voltage difference and the weld expansion voltage difference are combined in circuits 28 to produce a control voltage pulse (curve 9) on line 30 and to provide a slope rate control voltage or heat input voltage (curve 8) so that the expansion voltage pulse will attain a pre-established level of amplitude at a pre-set time. Thus method 3, while similar to method 2, imposes a time parameter so that expansion of the weld is driven toward a pre-selected level of magnitude in physical size within a pre-set time.

Since numerous changes may be made in the above apparatus and different embodiments may be made without departing from the spirit thereof, it is intended therefore that all matters contained in the foregoing description or shown in the accompanying drawings shall be interpreted as illustrative and not in a limiting sense.

I claim:
1. In a welding process, a method for controlling the heat input to the weld comprising the steps:
 (a) detecting a difference between curves representing an actual expansion voltage pulse from the weld and curves representing a pre-set expansion reference voltage pulse;
 (b) producing a control voltage pulse which is proportional to the detected difference; and,
 (c) controlling heat supply to the weld through application of the control voltage pulse to a heat control unit such that the slope of the curve representing the actual expansion voltage pulse from the weld is made to conform to the slope of the curve representing the pre-set expansion reference voltage pulse.

2. Apparatus for improving the quality of resistance welded joints, the combination comprising:
 (a) a welding machine having an upper movable electrode contacting a weld;
 (b) circuit means interconnecting said electrode and a differential transformer;
 (c) a clamping circuit connected by circuit means to said differential transformer to provide a reference voltage pulse characteristic of the mechanical position of said electrode upon the weld;
 (d) circuit means interconnecting said differential transformer, said clamping circuit and a summing amplifier so that an expansion voltage pulse from said differential transformer is summed in said amplifier to produce an expansion voltage pulse proportional to the voltage difference between the voltage pulse produced by said differential transformer and said clamping circuit; and
 (e) circuit means interconnecting said summing amplifier and a heat control voltage comparison circuit whereby the expansion voltage pulse from said summing amplifier is compared to a reference expansion voltage pulse to produce a control voltage signal which controls voltage applied to the weld apparatus.

References Cited
UNITED STATES PATENTS

| | | | |
|---|---|---|---|
| 2,472,368 | 6/1949 | Cox | 219—86 |
| 2,625,651 | 1/1953 | Schmidt | 219—108 |
| 2,851,584 | 9/1958 | Sciaky | 219—86 |
| 3,068,350 | 12/1962 | Archer | 219—110 |

RICHARD M. WOOD, *Primary Examiner.*

P. W. MAY, *Assistant Examiner.*